Nov. 13, 1945.  A. RUTTIMAN  2,388,766
HANDCUFFS
Filed May 5, 1944
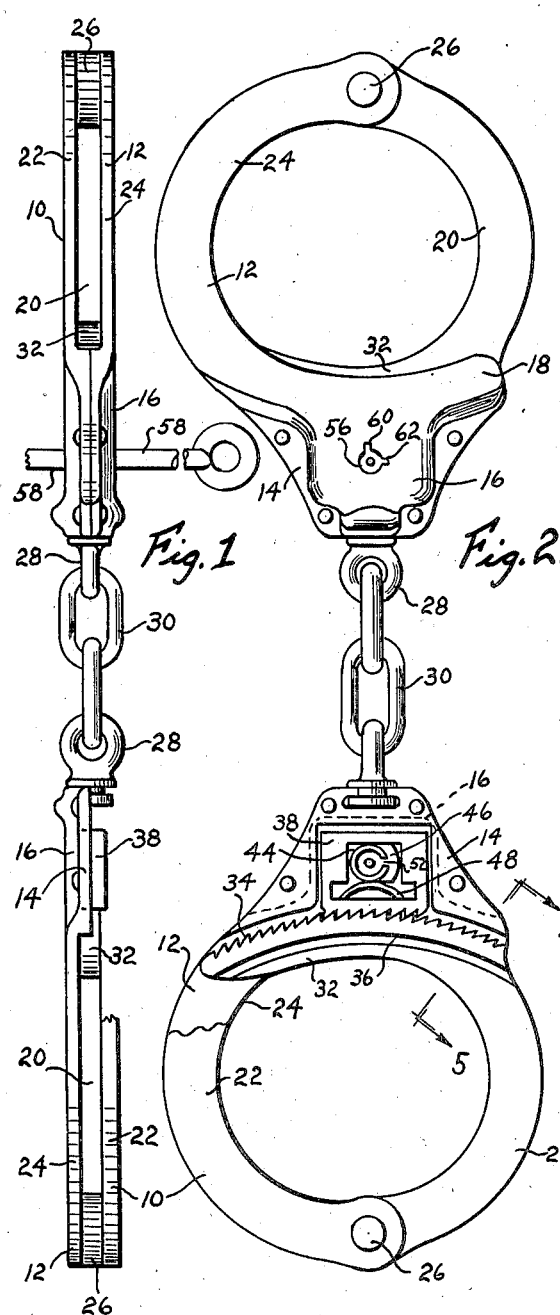
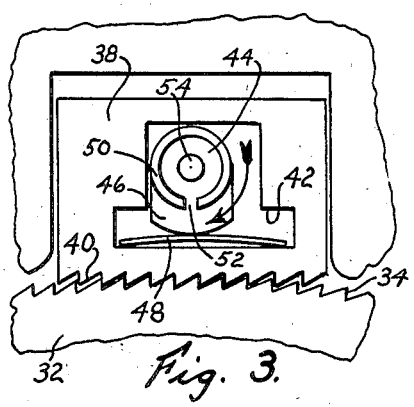
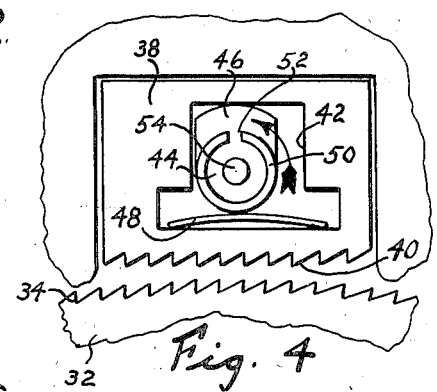
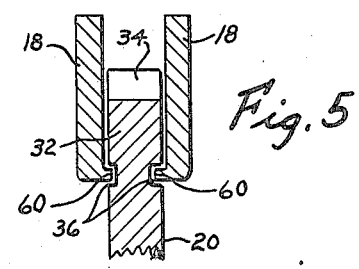
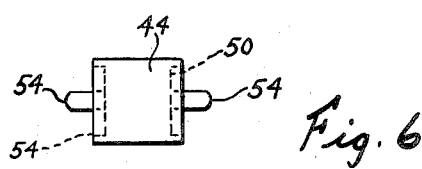
INVENTOR.
ALFRED RUTTIMAN
BY Charles R. Fay
atty.

Patented Nov. 13, 1945

2,388,766

UNITED STATES PATENT OFFICE 2,388,766

HANDCUFF

Alfred Ruttiman, Worcester, Mass., assignor to Harrington & Richardson Arms Company, Worcester, Mass., a corporation of Massachusetts Application May 5, 1944, Serial No. 534,278

9 Claims. (Cl. 70—16)

This invention relates to improvements in handcuffs principally of the ratchet type.

Objects of the invention include the provision of a handcuff or the like of the ratchet type having a new and improved lock which comprises a movable bolt accessible to a key from either side of the main frame of the cuff; and the provision of a handcuff having a swinging ratchet type bow adapted to swing in the locking direction only or selectively to swing freely in either the locking or unlocking direction depending on the position of a movable key-operated bolt in combination with a toothed operator element actuated thereby, there being a spring interposed between the bolt and operator element to provide for movement of the operator during the locking movement of the bow to permit passage of the bow ratchet teeth past the teeth on the operator in one direction only, the spring being inoperative when the bolt is turned to retract the operator from the range of the ratchet teeth on the bow so that the latter may swing out to free position.

Further objects of the invention include the provision of a cuff as aforesaid in which the bolt has a third position, determined by the key, wherein the operator is located so as to lock the bow against movement in either direction, the spring being rendered inoperative or so nearly so that the operator cannot be moved by the bow ratchet teeth to slip past the operator teeth.

Other objects and advantages of the invention will appear hereinafter.

Reference is to be had to the accompanying drawing, in which

Fig. 1 is an edge view of a pair of handcuffs shown in elevation with parts removed for illustrative purposes;

Fig. 2 is a side elevational view of the handcuffs of Fig. 1 with the same parts removed, and showing the lock in position for locking movement only of the bow;

Fig. 3 is an enlarged detail view of the lock showing the bow in locked condition wherein no movement thereof is possible;

Fig. 4 is a view similar to Fig. 3 but showing the operator retracted for free movement of the bow in either direction;

Fig. 5 is a section on line 5—5 of Fig. 2; and

Fig. 6 is a detail view of the bolt.

The cuffs of the present invention are particularly adapted to inexpensive manufacture and can be made largely of pressed metal parts. The main frame comprises right and left members complementary to each other and indicated by the numerals 10 and 12 respectively. These frame members are pressed and contact each other at the interior faces of flange-like parts 14 where they are riveted together. In the region of the flanges the frames are relatively pressed out to form a chamber at 16, this chamber forming a housing for the locking mechanism and a continuation thereof as at 18 receives the free end of the swinging bow 20.

The frame parts 10 and 12 are provided with arc-shaped members 22 and 24 which are spaced to form a passage for the bow so that it can swing through 360°. The bow is pivoted at the ends of members 22 and 24 and spaces the same as at 26, the interior surfaces of members 22 and 24 being substantially aligned with the exterior surfaces of the chamber 16. Each chamber is provided with a swivel 28 connected by a chain 30.

The free end of bow 20 is provided with an arced portion 32 whose center is at 26. This arced portion is provided with teeth 34 in the form of a ratchet and also with arc shaped grooves 36 for a purpose to be described.

The housing at 16 contains and forms a guide for a slidable operator 38 having teeth 40 complementary to the ratchet teeth 34 on the bow. An inverted T-shaped slot 42 extends through the operator, the leg of this slot receiving a rotary bolt 44 having an eccentric 46 thereon, it being noted that the axis of the bolt is off center as respects the edges of the slot so that the eccentric can only move counter-clockwise from the Fig. 3 position and clockwise from the Fig. 4 position. The arm of the T-shaped slot contains a bowed leaf spring 48 bearing on the bolt and constantly urging the operator toward the bow.

The bolt is held in place by the housing walls and has a circular ridge 50 at each side, these ridges being interrupted at 52 for receiving the key ward so that the bolt may be turned thereby. Central lugs 54 form guides for the key, which may be applied to the lock from either side of the frame through key-holes as at 56, see 58 in Fig. 1. The ward of the key may enter at 60 or 62.

As seen in Fig. 2, the eccentric 46 has been located transversely of the slot 42 and in this position the key is withdrawn through slot 62. In this location of the bolt the spring 48 has its widest range of expansion, as clearly indicated by the bow in the spring in this figure, and the operator 38 is free to be retracted against the spring sufficiently to free teeth 34 of the bow. However, this cannot be done except by the teeth 34 themselves camming teeth 40, and thus the bow may be moved in the locking direction only, that is, counter-clockwise in Fig. 2. Movement in the unlocking direction is inhibited by the operator teeth and the operator of course cannot be forced back by pressure on the bow in a clockwise direction.

In the position of the bolt in Fig. 3, the eccentric is down, i. e., pressed against the spring flattening the same and locking the operator with its teeth substantially immovably interlaced with teeth 34. In this case, the key is removable from the bolt through slot 60. The spring is inoperative and the eccentric prevents retraction of the operator so that movement of the bow in either direction is not possible.

In the Fig. 4 position the eccentric is up, i. e., pressing the operator to its farthest retracted location so that it is locked with the teeth 40 out of engagement with teeth 34 so that the bow is free to move either way. The spring is again inoperative and the key cannot be removed from the bolt, and therefore it is impossible to leave the handcuff in any condition but locked or ready for action unless the key is left in the lock.

As shown in Fig. 5, the frame members are provided with inwardly extending projections 60 riding in grooves 36 for guiding the bow and preventing prying of the same way from the operator.

It will be seen from the above disclosure that the present construction carries out the objects of the invention as stated, and that the key provides for locking the bow, releasing it, or allowing the locking direction movement thereof merely by turning and without removal, at either side of the frame; and that the construction allows for inexpensive manufacture mainly of pressed parts with little machining being necessary.

Having thus described my invention and the advantages thereof, I do not wish to be limited to the details herein disclosed, otherwise than as set forth in the claims, but what I claim is:

1. In a device of the class described, a frame, a housing thereon, a swingable bow having a toothed portion receivable in the housing, a toothed element in the housing, key-operated means including an eccentric to move the toothed element selectively to or from the path of the bow teeth, resilient means interposed between the toothed element and said first named means, said resilient means being effective to yieldingly hold the element with its teeth in ratcheting engagement with the teeth of the bow and selectively being tensioned to bow-locking condition, by the eccentric, the latter being engageable directly with the toothed element to positively move the latter out of engagement with the bow to unlock the same.

2. In a device of the class described, a frame, a toothed bow swingably mounted thereon, a housing on the frame for receiving the toothed portion of the bow, a movable operator element, teeth on the operator element, a bolt movable with respect to the operator element to move the latter into and out of toothed engagement with the bow, resilient means interposed between the bolt and the operator element, said bolt being selectively effective to engage and compress the resilient means in one position so as to lock the bow and to relieve the tension in another position to provide for yieldingly positioning the operator in ratcheting engagement with the bow.

3. In a device of the class described, a frame, a bow swingably mounted thereon, said frame forming a housing receiving a portion of the bow during a part of the swinging movement thereof, a lock in the housing comprising a movable operator element, a bolt for moving the same, and resilient means interposed between the bolt and operator, said bolt having an eccentric portion selectively engageable with the resilient means to compress the latter to a degree positively locking the operator, or being out of engagement therefrom to release the compression on the resilient means to provide for resilient yielding motion of the operator, and cooperating teeth on the operator and bow portion.

4. In a device of the class described, a frame, a housing thereon, a movable toothed operator element in the housing, a toothed bow, said housing receiving the toothed portion of the bow, a bolt, a spring between the bolt and the operator, said bolt having an eccentric portion for compressing the spring to lock the operator to the bow in toothed engagement therewith in one position of the bolt, said spring being substantially free of the eccentric in another position of the bolt but still effective to yieldingly hold the operator in toothed engagement with the bow.

5. The device of claim 4 wherein the operator is provided with a portion which the eccentric is adapted to engage in a third position of the bolt to free the operator and bow from their toothed engagement.

6. In a device of the class described, a frame, a swingable bow, teeth on the bow, a lock on the frame, said lock comprising a slidable operator, a rotary bolt actuatable by a key from either side of the frame, a spring between the bolt and operator, and teeth on the operator adapted for engagement with the teeth on the bow.

7. In a device of the class described, a frame, a toothed bow swingably mounted on the frame, a housing on the frame, a rotary bolt in the housing, means at either end of the bolt for receiving a key for turning the same, a slidable operator actuatable by the bolt and adapted to cooperate with the teeth on the bow in ratcheting engagement therewith or selectively to lock the bow.

8. In a device of the class described, a frame, said frame having walls forming a housing, a rotary bolt in the housing, an operator actuated by the bolt, a bow adapted to be selectively ratcheted, locked by or made free of the operator, means forming a double warded key-hole in a wall of the housing providing for access to the bolt by a key in free or ratcheted positions only thereof.

9. The device as recited in claim 2 wherein the bolt has a third position directly bearing on the operator element to move the latter away from the bow.

ALFRED RUTTIMAN.